Feb. 6, 1934.                G. W. NESMITH                1,946,330
           ADHESIVE LIQUID CONTAINER ADAPTED TO READY
                USE AND MEANS OF SEALING THE SAME
                      Filed April 21, 1932
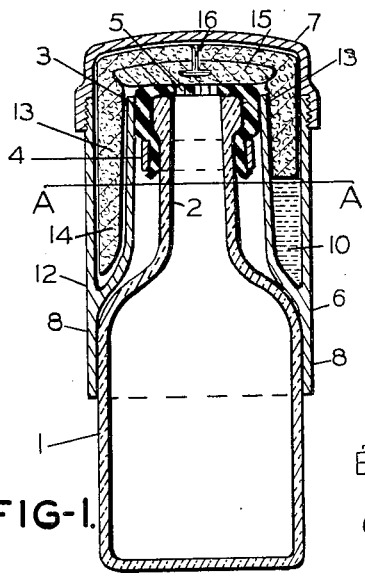
FIG-1.
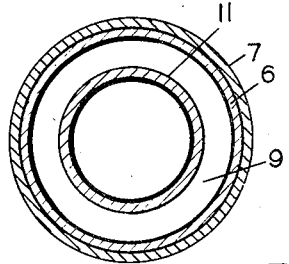
FIG-4.
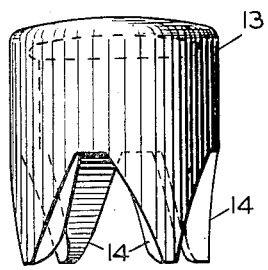
FIG-6.
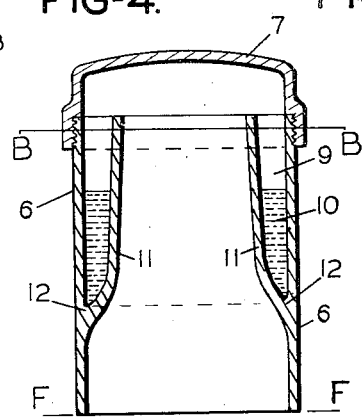
FIG-2. FIG-3.
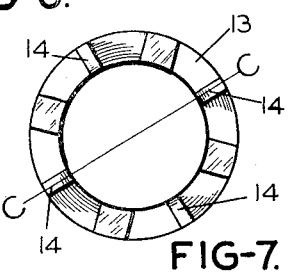
FIG-7.
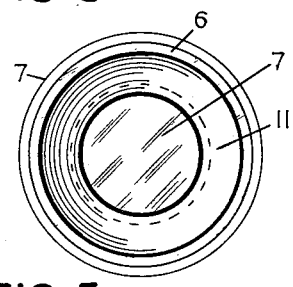
FIG-5.
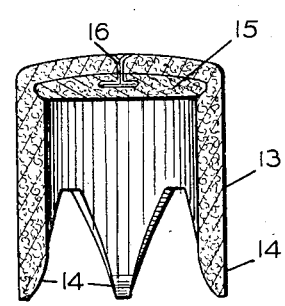
FIG-8.
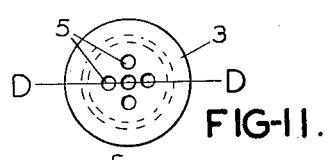
FIG-11.
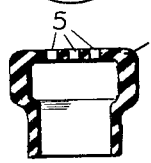
FIG-12.
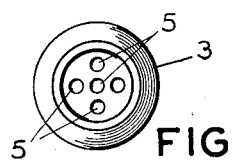
FIG-13.
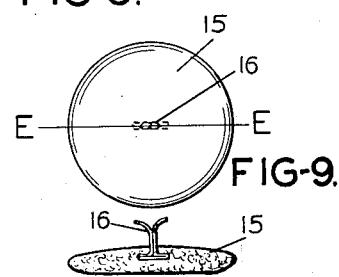
FIG-9.
FIG-10.
GEORGE W. NESMITH,
            INVENTOR.
BY *James R Cole*
          ATTORNEYS.

Patented Feb. 6, 1934

1,946,330

UNITED STATES PATENT OFFICE 1,946,330

ADHESIVE LIQUID CONTAINER ADAPTED TO READY USE, AND MEANS OF SEALING THE SAME

George W. Nesmith, Tulsa, Okla.

Application April 21, 1932. Serial No. 606,639

3 Claims. (Cl. 215—80)

My invention relates to new and useful improvements in adhesive liquid containers of the kind provided for ready use, and means of sealing the same, and has for its objects to provide a quick and convenient seal for a container wherein a sticky or adhesive liquid substance such as mucilage or glue is held for ready use; to provide said seal in form whereby it will not itself be caused to adhere to said container; to provide said sealing means in form whereby the air will be excluded from the opening or openings from which said liquid passes from the container and in manner whereby said sealing means will be kept moist; to provide a convenient reservoir for the moistening fluid with which said sealing means may communicate to retain a continuous moist condition.

With the above and other objects in view which will appear as the description proceeds, my invention consists in the novel features hereinafter set forth in detail, illustrated in the accompanying drawing and more particularly pointed out in the appended claims.

Referring to the drawing in which numerals of like character designate similar parts thruout the several views:

Fig. 1 is a sectional view in assembly of an adhesive liquid container with a cover thereon, embodying the invention.

Fig. 2 is a sectional view thereof on line A—A of Fig. 1.

Fig. 3 is a sectional view of said cover without the container, and showing the reservoir for the moistening fluid, with a liquid indicated in the reservoir, but without the absorbent material contained within the cover.

Fig. 4 is a view in cross section on line B—B of Fig. 3.

Fig. 5 is a bottom plan view of said cover on line F—F of Fig. 3.

Fig. 6 is a view in elevation of a combined sealing and moistening means, made of an absorbent material.

Fig. 7 is a bottom plan view of said combined sealing and moistening means shown in Fig. 6.

Fig. 8 is a view in cross section on line C—C of Fig. 7.

Fig. 9 is a top plan view of a detachable and replaceable seal for the container.

Fig. 10 is a view in cross section on line E—E of Fig. 9.

Fig. 11 is a top plan view of the cap for the container.

Fig. 12 is a view in cross section thereof on line D—D of Fig. 11.

Fig. 13 is a bottom plan view of said cap.

1 represents generally an adhesive liquid container such as a bottle to hold mucilage or glue or the like, with 2 a neck portion thereof terminating in a conventional opening which is covered by a cap 3, preferably of resilient material, and secured on said container by a band 4. The container cap 3 has perforations or holes 5 therein thru which the adhesive liquid which may be in said container may pass therefrom when the container is in use.

The container 1 is fitted with a cover, a cross section of which is shown in Fig. 3, wherein the preferred form thereof is disclosed, with 6 representing the body portion of the cover and 7 a screw top therefor, the two parts constituting the cover proper. Preferably the cover is made to fit tightly on the container 1, as indicated by the sliding fit at 8, for the purpose of retarding evaporation within the cover. 9 represents a reservoir within the body portion 6 of said cover, with a moistening fluid 10 indicated as contained therein, said reservoir being preferably formed by the wall of the body portion 6 of said cover and by an interior annular wall 11 joined to the wall of said body portion 6 as indicated at 12 with space between the body portion 6 and the wall 11 to form the reservoir 9. Preferably the reservoir 9 is as deep as practical for the character of container 1 with which the cover may be used.

Within the cover is placed an absorbent pad 13 which might also be termed a moistening means, with a portion thereof such as projections 14 adapted to extend into the reservoir 9 and absorb the moistening fluid in said reservoir and transmit the moisture to the sealing means. In the drawing a sealing means 15 of an absorbent material is shown as being a separate element from the absorbent pad 13 but with said sealing means joined to said absorbent pad and held in contact therewith by a pin or cleat 16. It is obvious that the pad 15, or sealing means as it has previously been termed, may be dispensed with and the absorbent pad 13 also made to serve as a seal directly applied to the cap 3 of the container. However the separate sealing means is preferred as it may be readily removed and replaced when it becomes too saturated with the adhesive liquid with which it comes in contact by reason of its remaining on the outside of the cap 3 of the container after the container has been in use.

The arrangement is such that when the container is not in use the cover is placed over it and the sealing means rests on the cap 3 of the container and seals the holes 5 thereof. The sealing means also seals all or a goodly portion of the surrounding top surface of the cap 3 against evaporation and against contact with the air which tends to congeal the adhesive liquid which might remain on the cap 3. The evaporation is further retarded in the cover by constructing the cover so that it will fit closely with a sliding fit on the container as at 8. It is also evident that if the cap 3 of the container is made to fit fairly snug within the wall 11 a further seal is provided against evaporation about the top of the cap 3 and from the absorbent material of the pads 13 and 15; and it is also apparent that if the wall 11 is made in form slightly constricted toward the top, or is beveled inwardly as shown in the drawing, this feature will also facilitate the sealing as aforesaid; and furthermore if the side wall of the cap 3 is made of a resilient material and is thick enough to form a pad at its circumference and slightly larger in diameter than the inside diameter of the wall 11, it will wedge therein and increase the effectiveness of the sealing means; and moreover if such a resilient pad around the side of the cap 3 is used, the size of the bottle head and neck need not be exactly uniform as any little variation between the diameters of the pad on the cap 3 and the inside diameters of the wall 11 would be taken up by the resilient pad on the cap.

To be used, the container is first filled or partially filled with any desired adhesive liquid as aforesaid and the cap 3 placed thereon and affixed thereto as shown. Water or other form of moistening fluid, is placed in the reservoir by removing the cap 7 from the cover and then filling the reservoir and replacing the absorbent materials such as the pads 13 and 15, after which the cap 7 is replaced on the cover. When not in use, the cover is placed on the container with the pad 15 over the top of the cap 3, the moisture from the pad 15 preventing the adhesive liquid which might be on the top of the cap from becoming congealed and preventing the sealing means from adhering to the cap 3. When it is desired to use the container, the cover is removed therefrom and the adhesive liquid is applied to the surface whereon it is desired to make the application, by tipping the container until the liquid flows therefrom, and applying the liquid directly from the container to the surface, after which the cover may again be placed on the container. A moistening fluid, such as water, is renewed in the reservoir as required, or the absorbent material such as the pads 13 and 15 may be moistened directly by the application of water thereto, but in the latter case the remoistening of the pads would be more frequent than the refilling of the reservoir. When the sealing means 15 becomes too sticky by reason of having absorbed too much of the adhesive liquid, it may be replaced with a fresh pad by disconnecting it from the pad 13, or it may be taken out and cleaned and then replaced, without having to replace or to clean the entire absorbent material in the cover.

Having thus fully disclosed my invention, what I claim and desire to secure by Letters Patent is:

1. A seal for an adhesive liquid container having an opening, said seal comprising a body portion, a reservoir therein wherein a moistening fluid may be placed, an absorbent material in said body portion and positioned therein to seal said opening of said container against exposure to the atmosphere and also adapted to absorb said moistening fluid from said reservoir, and means of holding said seal on said container.

2. In a cover adapted to seal an adhesive liquid container having an outlet, an absorbent pad adapted to seal the outlet, a liquid retaining reservoir in said cover, and means of transporting liquid from said reservoir to said absorbent pad to replace evaporation therefrom.

3. The combination of an adhesive liquid container, an opening therein, a cover for said opening adapted to fit over said opening and to receive and hold an absorbent substance placed therein, and an absorbent material as aforesaid positioned in said cover and adapted to seal said opening, a reservoir in said cover adapted to hold a fluid for moistening said absorbent material, and means communicating between said reservoir and said absorbent material for transporting liquid fluid held in said reservoir to said absorbent material.

GEORGE W. NESMITH.